United States Patent

[11] 3,580,099

[72] Inventor Ralph S. Mosher
 Schenectady, N.Y.
[21] Appl. No. 860,640
[22] Filed Sept. 24, 1969
[45] Patented May 25, 1971
[73] Assignee General Electric Company

[54] ARTICULATING MECHANISM
 10 Claims, 6 Drawing Figs.
[52] U.S. Cl....................................................... 74/469,
 74/521, 214/1CM
[51] Int. Cl........................................................ G05g 1/00
[50] Field of Search............................................ 74/469,
 521; 214/1 (RCM) 212/Inquiry

[56] References Cited
 UNITED STATES PATENTS
3,497,083 2/1970 Anderson et al.............. 214/1

Primary Examiner—Milton Kaufman
Attorneys—Paul A. Frank, Richard R. Brainard, John F. Ahern, Julius J. Zaskalicky, Joseph B. Forman, Frank L. Neuhauser and Oscar B. Waddell ABSTRACT: An articulating mechanism to provide large angular motions using a plurality of links, one of which includes a long and a short member in crossed relationship and a pair of side bars each pivotally connected to respective adjacent ends of the members. Extension bars on one side and on the other side of the long member and integral therewith function as side bars of a preceding and a succeeding link. Elimination of one type of extension bar on a link at one end of the mechanism and the other type of extension bar on a link at the other end of the mechanism provides transitional links for pivotal connection of the long cross bar of each of the transitional links to a respective rigid member.

PATENTED MAY25 1971
3,580,099
SHEET 1 OF 2
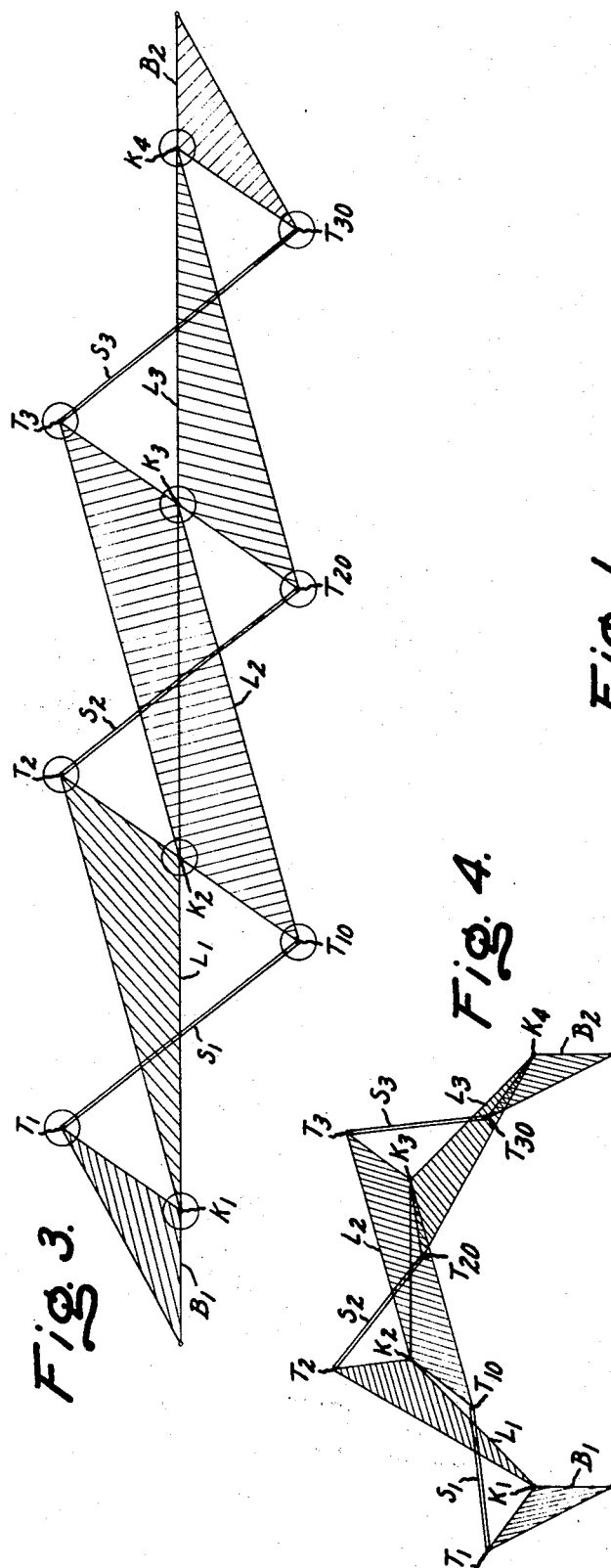
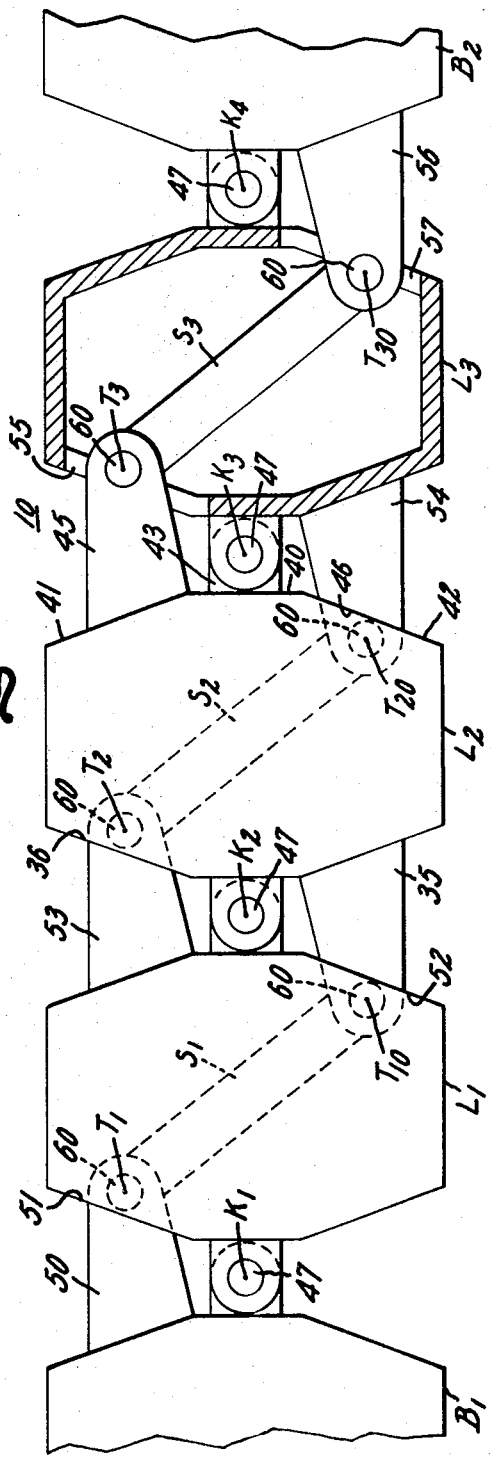
Inventor:
Ralph S. Mosher,
by His Attorney.

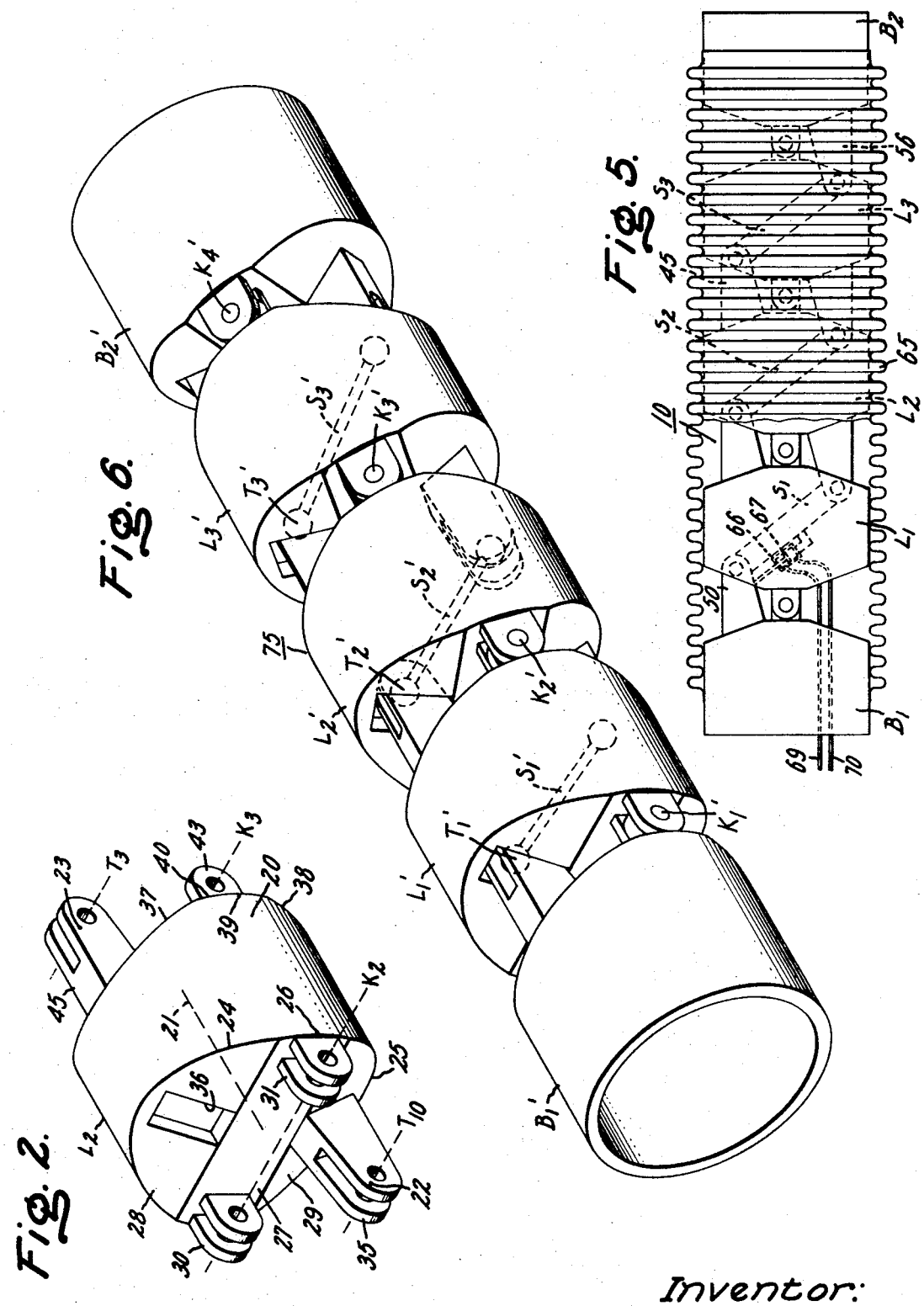

ARTICULATING MECHANISM

The present invention relates in general to articulating mechanisms and in particular to such mechanisms for providing large angular movements using a plurality of linked members.

A need exists in the art for a mechanism using a number of linked members which can be caused to execute any desired curling movement either in two dimensions or three dimensions, that is, in spiral or in helical form. Such a mechanism would be suitable for use in extra terrestrial machinery, in manipulators for handling nuclear and other such dangerous materials, and in foreign environments requiring execution of such angular movements. Such a mechanism would also be suitable for prosthetic applications. Such a mechanism could be used as a hinged or knuckle joint connecting two rigid members and permitting any desired orientation of the rigid members, one with respect to the other.

Such a mechanism would have a special merit if it were easily sealable from external environments such as vacuum, nuclear, underwater, abrasive, explosive and the like so as to render such mechanism usable in such environment without impairing the efficacy thereof. Such a mechanism would have added merit if it were rugged, had high strength for torque transmission in both the twist and the pivotal directions thereof, and had efficient torque transmission capability. Such a mechanism would have further merit if it were capable of being driven from either end or other part thereof to execute the desired movement.

The present invention is directed to the provision of an articulating mechanism meeting all of the requirements set forth above as well as other requirements.

Accordingly, it is a primary object of the present invention to provide improvements in articulating mechanisms of the character described.

It is another object of the present invention to provide an articulating mechanism which is not only rugged and capable of with standing large forces from all directions, but is also readily sealable against foreign environmental influences.

It is a still further object of the present invention to provide a linkage mechanism of longitudinal configuration which allows the entire mechanism to be sealed by a bellows or a series of bellows in which the bellows functions solely for the purpose of seal and is not used as a structural or driving member.

It is another object of the present invention to provide an articulating mechanism for executing a curling motion of any desired degree without the use of gears.

It is a further object of the present invention to provide an articulating mechanism which is light in weight, yet possesses high strength in all directions, which includes small number of parts, and which is easy to manufacture and fabricate.

In accordance with an illustrative embodiment of the present invention there is provided an articulating mechanism including a plurality of main link members. Each of the main link members have a longitudinal axis extending from one side to the other side thereof and a pair of pivotal axes, one on the one side and the other on the other side of the main link member. The pivotal axes lie in planes perpendicular to the longitudinal axis thereof. Adjacent sides of the main link members are joined with the adjacent pivotal axes thereof coincident and with the longitudinal axes thereof lying in a straight line. A plurality of synchronizing link members, each in correspondence with a respective main link member and each having a pivotal point at each end thereof are provided. Each of the synchronizing link members is disposed in crossed relationship with the longitudinal axis of the corresponding main member. Each of the main members includes an element integral therewith and pivotally connected to the adjacent end of an adjacent synchronizing link member to provide a pivotal point coincident therewith. Each of the main members intermediate the main members located at the ends of the mechanism include two such elements. Angular displacement of a pair of adjacent main link members will produce a corresponding angular displacement of each of the other main link members in respect to an adjacent link member.

The novel features which are believed to be characteristic of the present invention are set forth in the appended claims. The invention itself, however, together with further objects and advantages thereof may best be understood by reference to the following description taken in connection with the accompanying drawings wherein:

FIG. 1 is a plan view of an embodiment of the articulating mechanism of the present invention.

FIG. 2 is an isometric view of the center link member of the articulating mechanism of FIG. 1.

FIG. 3 is a schematic diagram of the articulating mechanism of FIG. 1 showing the link members thereof aligned with the longitudinal axis thereof in a straight line and showing the axes about which the link members pivot.

FIG. 4 is a schematic diagram of the link members of FIG. 3 representing their orientation when the base link members of FIG. 1 are oriented downward.

FIG. 5 is a plan view of the articulating mechanism of FIG. 1 showing the manner in which a flexible bellows covering may be applied over the mechanism to isolate the mechanism from external environment. Also shown in this FIG. is motive means for effecting movements of the mechanism.

FIG. 6 shows an isometric view of an articulating mechanism in accordance with another embodiment of the present invention.

Referring now to FIG. 1, there is shown a plan view of an embodiment of the articulating mechanism 10 of the present invention. The articulating mechanism includes a center main link $L_2$, transitional main link members $L_1$ and $L_3$ and base link members $B_1$ and $B_2$.

The structure of the center member $L_2$ is shown in greater detail in the isometric view of FIG. 2 to which reference is now made. The center link member $L_2$ comprises a cylindrical casing or shell 20 having a longitudinal axis 21 extending from one side or end to the other side or end thereof. At the one end is located a pivotal axis $K_2$ and at the other end thereof there is located another pivotal axis $K_3$. The pivotal axes $K_2$ and $K_3$ are parallel and lie in planes which are parallel and also which are perpendicular to the longitudinal axis 21. A pivotal point 22 is provided on one side of the casing lying in a plane perpendicular to the pivotal axis $K_2$ and containing the longitudinal axis 21. The pivotal point 22 is located below the longitudinal axis 21 a first predetermined distance and displaced outward from the parallel plane containing axis $k_2$ a second predetermined distance. A pivotal axis $T_{10}$ passes through the point 22 and is parallel to the axis $K_2$. On the other side of the casing 20 another pivotal point 23 is provided lying in the aforementioned plane including the longitudinal axis 21. The pivotal point 23 is located above the longitudinal axis 21 by the aforementioned first predetermined distance and displaced outward from the plane including axis $K_3$ by the aforementioned second predetermined distance. A pivotal axis $T_3$ passes through the point 23 and is parallel to the axis $K_3$. On the one end of the cylindrical casing 20, the edges 24 and 25 generally are tapered from a pair of diametrically opposed points thereon, only point 26 of which is shown, along an upper and lower plane each of which makes an acute angle with the longitudinal axis 21. A crosspiece 27 is provided aligned along the aforementioned diametrically opposed points and secured to the end of the casing. An upper planar end cap 28 in the form of a planar segment and a lower planar end cap 29 also in the form of a planar segment are secured to the upper edge 24 and the lower edge 25 respectively of the end of the casing. A pair of U-shaped bearing elements 30 and 31 are provided at diametrically opposed ends of the crosspiece 27 and secured thereto. Each of the U-shaped members 30 and 31 have axially aligned cylindrical bearing surfaces in the legs thereof. The axis of the U-shaped bearing element 30 and the axis of the U-shaped bearing element 31 are coincident with the axis $K_2$. A third U-shaped bearing element 35 is secured to the lower end cap 29. Each of the legs of the U-shaped element 35 are provided with a cylindrical bearing surface having an axis coincidental with axis $T_{10}$. The bearing element 35 is aligned such that the point 22 is on the axis $T_{10}$ midway between the inner side faces of legs of U-shaped element 35. The upper end cap 28 is provided with a rectangular aperture 36 which permits passage therethrough of a U-shaped bearing element similar to U-shaped bearing element 35 from an adjacent link member.

The other end of the casing member 21 also has an upper edge 37 and a lower edge 38 extending from a pair of diametrically opposed points, only point 39 of which is shown and generally lying in planes which make the same acute angle with respect to the longitudinal axis as the corresponding planes on the one end of the casing. A crosspiece is provided aligned along the diametrically opposed points and secured to the end cap 42 shown in FIG. 1 are secured to the upper and lower edges of the casing 20 similar to end caps 29 and 28, respectively. A pair of diametrically opposed tongue elements, only element 43 of which is shown, are provided on the crosspiece 40, each having a cylindrical-bearing surface having an axis therein aligned with the axis $K_3$. The tongue-bearing elements are spaced with respect to one another and are shaped to mate with a respective pair of U-shaped bearing elements on adjacent link member such as appears on the one end of casing with the adjacent pivotal axes of the bearing elements coincidental. A U-shaped bearing element 45 is secured to the upper end cap 41. Each of the legs of the element 41 are provided with cylindrical-bearing surfaces having an axis coincidental with axis $T_3$. The bearing element 45 is aligned such that the point 23 appears on the axis $T_3$ midway between the inner side faces of the legs of U-shaped bearing element 45. The lower end cap 42 is provided with a rectangular aperture 46 shown in FIG. 1 similar to aperture 36 which permits passage therethrough of a bearing element similar to bearing element 35 of an adjacent link member.

Referring again to the articulating mechanism of FIG. 1, member $L_1$ is identical to member $L_2$ except that a bearing element corresponding to lower bearing element 35 has been eliminated. Similarly, member $L_3$ is identical to member $L_2$ except that the upper bearing element corresponding to upper bearing element 45 has been eliminated. Base member $B_1$ is similar to the right half of the main link member $L_2$ with the aperture in the lower end cap thereof eliminated. Similarly, base member $B_2$ is identical to the left half of the main link member $L_2$ with the aperture in the upper end cap thereof eliminated. The members $L_1$, $L_2$, $L_3$, $B_1$, $B_2$ are identically proportioned so that the left-hand bearing elements lying along the longitudinal axes thereof of one member mate with the right-hand bearing elements of an adjacent member with the adjacent pivotal axes thereof coincident. Pins 47 are inserted into the registered cylindrical bearing surfaces of adjacent link members to pivotally tie them together in pivotal axes $K_1$, $K_2$, $K_3$ and $K_4$.

The upper bearing element 50 of member $B_1$ having an axis $T_1$ extends into the upper aperture 51 of member $L_1$. The lower bearing element 35 of member $L_2$ having an axis $T_{10}$ extends into the lower aperture 52 of $L_1$. The upper bearing element 53 of member $L_1$ having an axis $T_2$ extends into the upper aperture 36 of member $L_2$. The lower bearing element 54 of member $L_3$ having an axis $T_{20}$ extends into the lower aperture 46 of member $L_2$. The upper bearing element 45 of member $L_2$ having an axis $T_3$ extends into the upper aperture 55 of member $L_3$. The lower bearing element 56 of member $B_2$ having an axis $T_{30}$ extends into the lower aperture 57 of member $L_3$.

The articulating mechanism also includes a plurality of synchronizing link members $S_1$, $S_2$ and $S_3$. Each of the synchronizing link members are identical. Each of the synchronizing link members is in the form of an elongated rod having a cylindrical-bearing surface at each end. The pivotal axis at one end of $S_1$ adjacent element 50 is coincidental with axis $T_1$. The pivotal axis at the other end of $S_1$ adjacent element 35 is coincidental with axis $T_{10}$. The pivotal axis at one end of $S_2$ adjacent element 53 is coincidental with axis $T_2$. The pivotal axis at the other end of $S_2$ adjacent element 54 is coincidental with axis $T_{20}$. The pivotal axis at one end of $S_3$ adjacent element 45 is coincidental with axis $T_3$. The pivotal axis at the other end of $S_3$ adjacent element 56 is coincidental with axis $T_{30}$. Pins 60 are inserted in the registered bearing surfaces of member $S_1$ and elements 50 and 35 to pivotally connect the member $S_1$ thereto. Synchronizing members $S_2$ and $S_3$ are also similarly pivotally connected between bearing elements 53 and 54, and 45 and 56, respectively, by means of pins 60. In the embodiment of FIG. 1 of the pivotal axes of all of the members are parallel, i.e., axes $K_1$, $K_2$, $K_3$, $K_4$, $T_1$, $T_2$, $T_3$, $T_{10}$, $T_{20}$, and $T_{30}$ are parallel.

Referring now to FIG. 3, there is shown a schematic diagram of the articulating mechanism of FIG. 1 in which corresponding parts are indicated with the same designations. The main link members are indicated by cross hatched areas. The dots surrounded with circles indicate pivotal axes oriented perpendicular to the plane of the FIG. The longitudinal axes of the main link members $L_1$, $L_2$ and $L_3$ are oriented in a straight line. Synchronizing link member $S_1$ is in crossed relation with the longitudinal axis of member $L_1$. A pair of adjacent ends of the main link member $L_1$ and synchronizing link member $S_1$ are pivotally joined in axes $T_1$ and $K_1$ by a side element integral with member $B_1$. The other pair of adjacent ends of the main link member $L_1$ and synchronizing link member $S_1$ are pivotally joined in axes $T_{10}$ and $K_2$ by another side element integral with member $L_2$. Synchronizing link member $S_2$ is in crossed relation with the longitudinal axis of member $L_2$. A pair of adjacent ends of the main link member $L_2$ and the synchronizing link member $S_2$ are pivotally joined in axes $T_2$ and $K_2$ by a side element integral with member $L_1$. The other pair of adjacent ends of the main link member $L_2$ and the synchronizing link member are pivotally joined in axes $T_{20}$ and $K_3$ by another side element integral with the member $L_3$. Synchronizing link member $S_3$ is in crossed relation with the longitudinal axis of member $L_3$. A pair of adjacent ends of the main link member $L_3$ and the sychronizing link member $S_3$ are pivotally joined in axes $T_3$ and $K_3$ by a side element integral with member $L_2$. The other pair of adjacent ends of the main link member $L_3$ and the synchronizing link member $S_3$ are pivotally joined in axes $T_{30}$ and $K_4$ by another side element integral with the member $B_2$.

FIG. 4 is a schematic diagram, similar to the schematic diagram of FIG. 3, of the articulating mechanism of FIG. 1 in which the base members $B_1$ and $B_2$ thereof are oriented downward. Such an orientation is produced when the base member $B_1$ is rotated about the axis $K_1$ in a counterclockwise direction to reduce the angle between the longitudinal axes of members $B_1$ and $L_1$. Such a rotation causes the other members of the linkage to repeat the action of the movement of member $B_1$ with respect to member $L_1$ to produce the orientation shown. When base member $B_1$ is rotated about axis $K_1$ in a clockwise direction to reduce the angle between the longitudinal axes of members $B_1$ and $L_1$ an orientation results in which $B_1$ and $B_2$ extend upward. The relation of the other members for such an orientation is similar to the orientation shown in FIG. 4. The maximum angle of rotation of member $B_1$ with respect to member $L_1$, and also member $L_1$ with respect to member $L_2$, member $L_2$ with respect to member $L_3$ and member $L_3$ with respect to member $B_2$, is 45°. Such a limit is set by the inclination of the end caps of the link members $L_1$, $L_2$ and $L_3$ with respect to the longitudinal axes thereof. To obtain the 45° limit of angular displacement the end caps of each of the main link members are inclined 67½° with respect to the longitudinal axes of a respective main link member. Of course should other limits of angular displacement be desired corresponding inclinations in the end caps would be provided.

In FIG. 4 a movement of 180° in either direction of member $B_2$ with respect to member $B_1$ can be achieved. Of course, it will be appreciated that by increasing the number of main link members such as main link member $L_2$ and the corresponding synchronizing link members, movements of greater angular extent can be achieved.

In the schematic diagram of FIG. 1 a synchronizing link member, is crossed with the longitudinal axis of a respective main link member to form an acute angle which is about 45°. Such an angular relationship provides good torque transmission from link to link. In the two extreme orientation positions of the mechanism one of which is exemplified in FIG. 4 the aforementioned angle is either about 30° or about 60° depending on the orientation, and accordingly, good torque transmission is maintained regardless of the orientation of the articulating mechanism. Also, it will be appreciated that the longitudinal axes of the main link members do not have to be of the same length. The longitudinal axis of one main member may be longer than the longitudinal axes of the other main members and the corresponding synchronizing link member would be longer than the other synchronizing link members. With such an organization the angular displacement between the longitudinal axes of main link members adjacent to such an altered main link member is changed for a given angular displacement between other main link members of the mechanism. Also, any one main link member of the mechanism, the axes provided by the bearing elements of the main link member, may be located closer to the longitudinal axis of the main link member. Such an arrangement also has the effect of changing the angular displacement between the longitudinal axes of the associated main link members for a given angular displacement between other main link members in the mechanism.

Referring now to FIG. 5, there is shown a plan view of the articulating mechanism 10 of FIG. 1 in which a flexible bellows member 65 is provided completely surrounding the articulating mechanism and isolating it from the external environment. The articulating mechanism 10 of FIG. 5 is identical to the articulating mechanism of FIG. 1 and corresponding parts are denoted by the same symbol. The bellows member 65 is fixedly secured to the casing portions of the main link members $B_1$, $L_1$, $L_2$, $L_3$ and $B_2$. While the bellows member 65 is shown as continuous it is apparent that individual bellows element may be provided between adjacent ends of adjacent casings. In FIG. 5 is also shown a piston actuator 66 having a piston 67 connected to the bearing element 50 of member $B_1$ and having the cylinder thereof connected to the syncrhonizing link member $S_1$. A pair of fluid lines 69 and 70 are provided for providing fluid pressure on one side or the other side of the piston to move the synchronizing link member in respect to the base member about the axis $K_1$ to produce the articulating action described in connection with FIG. 4. It is apparent that the actuator 66 may also be connected between the base member $B_1$ and the link member $L_1$. It is also apparent that the actuator may be connected between other main link members in the manner described in connection with members $B_1$ and $L_1$ to provide articulating action desired.

Referring now to FIG. 6, there is shown an isometric view of an articulating mechanism 75 in accordance with another embodiment of the present invention. The articulating mechanism 75 includes a plurality of main link members $B_1'$, $L_1'$, $L_2'$, $L_3'$ and $B_2'$ each similar to the corresponding members of FIG. 1; however, each differing in several respects from the corresponding members of FIG. 1 which will be best illustrated in connection with main link $L_2$. The pivotal axis $K_3'$ and $T_3'$ of bearing elements of $L_2'$ on the right-hand side thereof are displaced by a desired angle with respect to the axis $K_2$ and axis $T_2$ of the bearing elements on the left-hand side thereof. Similar changes are made in each of the elements $L_1'$, $L_3'$ and also in $B_1'$ and $B_2'$, and of course, the same eliminations are provided in members $L_1'$, $L_3'$, $B_1'$ and $B_2'$ in respect to $L_2'$ as provided in the corresponding members $L_1$, $L_3$, $B_1$ and $B_2$ in respect to member $L_2$. Also, the synchronizing elements $S_1'$, $S_2'$, $S_3'$ corresponding to elements $S_1$, $S_2$ and $S_3$ of the articulating mechanisms of FIG. 1 are joined at their ends in ball and socket joints to bearing elements of the members as the movement of the synchronizing link members do not take place in single plane. Accordingly, the angular displacement of member $B_1'$ with respect to member $L_1'$ is communicated through synchronizing link $S_1'$ to displace corresponding member $L_1'$ with respect to member $L_2'$ and so on to member $B_2'$. As the pivotal axis on one side of a link member for example member $L_2'$ is skewed with respect to the pivotal axis on the other side thereof the resultant configuration becomes helical.

What I claim as new and desire to secure by Letters Patent of the United States is:

1. An articulating mechanism comprising
    a plurality of main link members, each having a longitudinal axis extending from one side to the other side thereof and each having a pair of pivotal axes, one on said one side and the other on said other side thereof, said pivotal axes lying in planes perpendicular to said longitudinal axis and passing through said longitudinal axis,
    said main link members having adjacent sides connected with the axes thereof coincident and aligned with the longitudinal axes thereof lying in a straight line,
    a plurality of synchronizing link members, each having a pivotal point at each end thereof,
    each of said synchronizing links in crossed relationship with the longitudinal axis of a respective main link member,
    each of said main members including an element integral therewith and pivotally connected to the adjacent end of an adjacent synchronizing link member, said element providing a pivotal point coincident with an adjacent pivotal point of said adjacent synchronizing link member.

2. The combination of claim 1 in which each of said main members includes a pair of elements integral therewith, one element located on one side of said main member and pivotally connected to the adjacent end of an adjacent synchronizing link member, the other element located on the other side of said main link member and pivotally connected to the adjacent end of an adjacent synchronizing link member.

3. The combination of claim 1 in which the pivotal axes of a main member are parallel.

4. The combination of claim 1 in which the pivotal axis on one side of said main member is skewed with respect to the pivotal axis on the other side thereof.

5. The combination of claim 1 in which each of said main links includes a generally cylindrical member extending about the longitudinal axis thereof and having at one end thereof a pair of bearing elements defining said one pair of axes and having at the other end thereof another pair of elements defining the other of said pair of axes, and in which said element is oriented on an end of said cylindrical member such that the pivotal point thereof lies in a plane which includes the longitudinal axis of said main link member and is perpendicular to the pair of axes on the same end thereof.

6. The combination of claim 5 in which edges of each end of said cylindrical member are tapered from diametrically opposed points on an end so as to lie generally in planes making an acute angle with respect to the longitudinal axis of a main link.

7. The combination of claim 5 in which said pivotal points are provided by universal joints.

8. The combination of claim 1 in which the longitudinal axes of each of said main link members are identical and in which the length of said synchronizing link members between the pivotal points thereof are equal.

9. The combination of claim 1 in which means are provided for pivoting a main member with respect to an adjacent main member about the axis common thereto.

10. The combination of claim 1 in which flexible cylindrical bellows element surrounds said main link members and said synchronizing link members.